United States Patent [19]

Kambayashi et al.

[11] Patent Number: 4,887,349
[45] Date of Patent: Dec. 19, 1989

[54] METHOD AND APPARATUS FOR MANUFACTURING ELECTRODE FOR BATTERY

[75] Inventors: Makoto Kambayashi, Hyogo; Kensuke Nakatani, Sumoto; Kazuaki Ozaki, Sumoto; Masahito Tomida, Sumoto; Hiroshi Haraguchi, Hyogo; Takeo Hamamatsu, Sumoto, all of Japan

[73] Assignee: Sanyo Electric Co., Ltd., Moriguchi, Japan

[21] Appl. No.: 225,696

[22] Filed: Jul. 29, 1988

[30] Foreign Application Priority Data

Jul. 30, 1987 [JP] Japan .............................. 62-191954
Nov. 24, 1987 [JP] Japan .............................. 62-296486
Dec. 18, 1987 [JP] Japan .............................. 62-322544

[51] Int. Cl.⁴ ........................................... H01M 4/20
[52] U.S. Cl. ................................. 29/623.5; 141/1.1; 118/114; 118/424
[58] Field of Search ................ 29/623.5, 623.1, 110, 29/120, 730, 731, 724, DIG. 70; 141/1.1, 12, 32, 125; 118/DIG. 15, 107, 114, 110, 409, 423, 424, 428

[56] References Cited

U.S. PATENT DOCUMENTS

| | | | |
|---|---|---|---|
| 3,910,230 | 10/1975 | Mercer | 118/114 X |
| 4,081,005 | 3/1978 | Gray et al. | 29/623.5 |
| 4,245,584 | 1/1981 | Kolosov | 141/1.1 X |

Primary Examiner—Anthony Skapars
Attorney, Agent, or Firm—Armstrong, Nikaido, Marmelstein, Kubovcik & Murray

[57] ABSTRACT

A method of manufacturing an electrode for a battery comprises steps of preparing a substrate formed by a metal porous body having three-dimensionally continuous pores, a slurry mainly composed of active material powder to be filled into the pores of the substrate, a vessel for containing the slurry and a filling roller located to be at least partially dipped but not completely submerged in the slurry contained in the vessel, continuously supplying the substrate onto the filling roller so that the substrate is in contact with the filling roller in at least a point not being submerged in the slurry and rotating the filling roller in such a manner that the speed of outer peripheral surface of the filling roller facing the substrate is higher than the travel speed of the substrate thereby to fill the slurry into the pores of the substrate.

13 Claims, 4 Drawing Sheets

METHOD AND APPARATUS FOR MANUFACTURING ELECTRODE FOR BATTERY

BACKGROUND OF THE INVENTION

1. Field of the Invention

The present invention relates to a method and an apparatus for manufacturing an electrode for a battery employing a metal porous body having three-dimensionally continuous pores as a substrate, to be applied to an alkaline storage battery or the like.

2. Description of the Prior Art

As a method of manufacturing an electrode which is applied to an enclosed-cell type alkaline storage battery etc., a non-sintering type manufacturing method of filling a metal porous body having three-dimensionally continuous pores with active material powder has been studied to take the place of a general sintering type manufacturing method. This non-sintering type manufacturing method is considered as being effective for reducing the cost and improving performance since manufacturing steps thereof are simplified and the time required for manufacturing can be reduced, while energy density of the electrode can be easily increased.

A concrete example of this manufacturing method comprises the following steps: A felt-type sintered body of nickel fiber, called a nickel mat, having physical properties of 20 μm in fiber diameter, 50 μm in average pore diameter and 93% in porosity is employed as a substrate, to be filled with a slurry prepared by mixing active material powder mainly composed of nickel hydroxide powder of 20 μm in average particle size into a binder solution. Then the sintered body is dried and pressurized/compressed to provide an electrode.

However, the nickel mat has originally been developed as a filter, and hence the active material powder is filtrated by the surface of the nickel mat, which allows passage of only the liquid, in operation for filling of the active material slurry. Thus, the active material cannot be filled into the nickel mat in prescribed volume.

In Japanese Patent Publication Gazette Nos. 31832/1984, 24492/1984 or 37665/1981, a slurry supplied by a rubbing member which is transferred to the surface of a substrate and is mechanically rubbed into the substrate in order to solve the aforementioned problem. In such a method, however, the apparatus is complicated in structure and it is difficult to homogeneously fill the substrate with the slurry.

Japanese Patent Laid-Open Gazette Nos. 81868/1984 or 143270/1984 discloses a method of spraying a slurry of an active material to a substrate with air, to fill the same by pressure. In this method, however, the substrate must be sufficiently rigid to withstand high pressure spray. Further, the filling volume is reduced since the slurry is supplied with air, while it is difficult to fill the slurry in constant volume.

In the general sintering type manufacturing method, a substrate is impregnated with a solution of raw salt containing an active material, and then the raw salt is converted into the active material by a chemical, electrochemical or thermal method. In this method, the filling operation is repeated several times since the active material cannot be filled in the prescribed volume at once, due to large differences in density between the active material and the salt solution. Thus, every filling volume can be measured so that the total filling volume accurately reaches a prescribed value.

In the non-sintering type manufacturing method, on the other hand, it is difficult to obtain the filling volume to a prescribed value since the filling operation is performed only once. As an improved method of filling a metal porous body having three-dimensionally continuous pores with an active material, Japanese Patent Laid-Open Gazette No. 10833/1978 discloses a method of homogeneously filling the active material by sufficiently pre-moistening the interior of the metal porous body with a liquid. Further, Japanese Patent Laid-Open Gazette No. 10834/1978 discloses a method of filling paste of an active material having a high moisture content in the first place and then filling paste of an active material having a low moisture content. However, these methods fail to provide an improvement for attaining filling volume to a prescribed value.

Japanese Patent Laid-Open Gazette No. 105363/1987 discloses a method of filling a metal porous body with active material paste of 1000 to 4000 cp. in viscosity by rotating a roller having a plurality of grooves. In the method of this prior art, however, the roller is submerged in the paste, and hence air contained in the metal porous body must be outwardly extruded into the paste. Since it is difficult to smoothly expel such air from the porous body in a direction opposite to that for filling the paste, air cannot be sufficiently replaced by the paste in the porous body. Thus, it is difficult to uniformalize the filling volume of the paste in the porous body. Japanese Patent Laid-Open Gazette No. 52863/1988, which discloses similar technique, has the same problem.

Japanese Patent Laid-Open Gazette No. 40837/1978 describes a method of filling a metal porous body having three-dimensionally continuous pores with a paste-type substance mainly composed of active material powder, pressure-molding the same and then impregnating the pressure-molded body with a dispersion medium of fluororesin. According to this method, the active material can be prevented from falling caused by repeated charge/discharge by increasing the binding power of the active material with respect to the metal porous body. In this case, however, a new problem is created; specifically the active material inevitably falls from the substrate in impregnation with the dispersion medium. This is because the active material which is weakly held on the substrate surface falls off with the fluororesin dispersion medium when the substrate is lifted from the dispersion medium, since the substrate is impregnated with fluororesin being in the form of a liquid. In the method of impregnating the pressure-molded body with the fluororesin dispersion medium, further, the amount of adhesion of fluororesin is dispersed if the substrate surface is inhomogeneous in a former stage. Although there has been proposed a method of adding a binder of fluororesin or the like into the paste of an active material, internal resistance of the electrode is increased notwithstanding improvement in binding property.

SUMMARY OF THE INVENTION

An object of the present invention is to provide a method and an apparatus for manufacturing an electrode for a battery which is excellent in various characteristics by homogeneously filling a substrate formed by a metal porous body having three-dimensionally continuous pores with a slurry of an active material through efficient manufacturing steps at a high filling rate.

Another object of the present invention is to provide a method of manufacturing an electrode for a battery which is stabilized in quality and improved in electrode characteristic by filling a substrate formed by a metal porous body having three-dimensionally continuous pores with a slurry of an active material in filling volume accurately reaching a set value.

Still another object of the present invention is to provide a method of manufacturing an electrode for a battery which is stabilized in quality by effectively forming a layer of fluororesin serving as a binder thereby to suppress falling of an active material from the surface of a substrate in manufacturing steps.

According to a first aspect of the present invention, a method of manufacturing an electrode for a battery comprises a step of preparing a substrate formed by a metal porous body having three-dimensionally continuous pores, a slurry mainly composed of active material powder to be filled into the pores of the substrate, a vessel for containing the slurry and a filling roller located to be at least partially dipped but not completely submerged in the slurry contained in the vessel, a step of continuously supplying the substrate onto the filling roller to be in contact with the roller in at least a point not being submerged in the slurry and a step of rotating the filling roller in such a manner that the speed of outer peripheral surface of the filling roller facing the substrate is higher than the travel speed of the substrate thereby to fill the slurry into the pores of the substrate.

In the first aspect of the present invention, the slurry is preferably prepared by a viscous fluid showing Newtonian flow. Further, viscosity of the slurry is preferably in the range of 1000 to 10000 cp. The speed of outer surface of the filling roller relative to the substrate is preferably at least three times faster than the travel speed of the substrate.

In this specification, the speed of outer peripheral surface of the filling roller relative to the substrate means the speed of outer peripheral surface of the filling roller with respect to the substrate regarded as being at rest.

According to the first aspect of the present invention, provided is an apparatus for filling a slurry mainly composed of active material powder into pores of a continuously supplied substrate formed b a metal porous body having three-dimensionally continuous pores, which apparatus comprises means for continuously supplying the substrate, a vessel containing the slurry, a filling roller being located to be at least partially dipped but not completely submerged in the slurry contained in the vessel and brought into contact with the substrate in at least a point not being submerged in the slurry contained in the vessel for filling the slurry into the substrate, and driving means for rotating the filling roller in such a manner that the speed of outer peripheral surface of the filling roller facing the substrate is higher than the travel speed of the substrate.

In this apparatus, the speed of outer peripheral surface of the filling roller relative to the substrate is preferably at least three times faster than the travel speed of the substrate. More preferably, the filling roller is provided on its outer peripheral surface with grooves extending perpendicularly to the direction of rotation.

The inventors have prepared various active materials mainly composed of slurried nickel hydroxide powder to examine the filling property with respect and a substrate, to recognized that the problem of filtration on the substrate surface can be effectively solved by preparing a slurry to show Newtonian flow by adding appropriate volume of a binder solution or the like. This may be considered because affinity between the liquid and the powder is improved to substantially cause no separation, thereby to maintain fluidity on the substrate surface.

However, it is also recognized that filterability cannot be completely prevented through use of such a slurry but a small amount of cake-type slurry, being reduced in content, is adhered to the surface of the substrate merely dipped in the slurry, leaving pores filled with no slurry in the interior of the substrate. It has been clarified through study by the inventors that it is important to efficiently perform an auxiliary filling operation to prevent liquid-powder separation, as well to replace air by the slurry in the interior of the substrate, in order to prevent adhesion of such a cake-type slurry of a low moisture content and residual of unfilled pores.

The manufacturing method and apparatus of the first aspect reflects the aforementioned study. According to the first aspect, a substrate can be homogeneously filled with an active material through efficient manufacturing steps at a high filling rate, with excellent industrial merit.

A manufacturing method according to a second aspect of the present invention comprises a step of filling a substrate formed by a metal porous body having three-dimensionally continuous pores with a slurry mainly composed of active material powder, a step of compressing the substrate thus filled with the slurry to a prescribed thickness by a compression roller which is partially submerged in the slurry and a step of scraping off slurry adhered to the surface of the compressed substrate by a scraper.

In the second aspect of the present invention, the slurry to be filled into the substrate is preferably prepared by that having fluidity, to cause no solid-liquid separation. The compression roller is preferably submerged in part in the slurry for pressurizing the substrate. The amount of compression of the substrate is preferably not more than 0.1 mm.

The inventors have discovered that powder forming a slurry must not be separated from a dispersion medium on a substrate in order to homogeneously fill a metal porous body having three-dimensionally continuous pores with the slurry, and a set value of filling volume for filling a slurried active material into the substrate is based on density of the slurry, as well as porosity and thickness of the substrate. The second aspect is based on these factors. Thus, required volume of the slurry is determined from slurry composition with respect to the amount of the active material in the set value, and required thickness of the substrate is determined by the said volume as well as the dimension and porosity of the substrate. In theory, therefore, homogeneous filling volume can be obtained to reach the set value if weight and thickness per unit area of the substrate and slurry composition are homogeneous. However, it is difficult to equalizer the filling volume since thickness and weight of the substrate are fluctuated in certain ranges and air bubbles may be mixed into the filled slurry in practice. Although there is a method of uniformalizing thickness of a substrate through a roller in advance to filling operation, a sufficient effect cannot be obtained.

The inventors have tried to adjust thickness of the substrate after filling of the slurry to recognize a large effect of such a method, thereby to complete the second aspect of the present invention. According to this method, a substrate is prepared to have a thickness slightly larger than a prescribed level to be filled with an active material slurry. Then the substrate is compressed to a prescribed thickness through a roller while an excessive part of the active material slurry is discharged and a slurry part adhered to the substrate surface is scraped off by a scraper. Thereafter the substrate is dried.

It is supposed that an excellent effect is attained by temporarily filling the slurry in excess volume and then passing the substrate through the roller because air mixed in filling is expelled through compression by the roller, to reduce dispersion in filling rate.

According to the second aspect, the active material can be homogeneously and accurately filled into the metal porous body. Thus, an electrode formed by the metal porous body can be stabilized in electrode characteristic, with excellent industrial merit.

A manufacturing method according to a third aspect of the present invention comprises a step of filling a substrate formed by a metal porous body having three-dimensionally continuous pores with an active material and a step of adhering bubbles of a dispersion medium of fluororesin onto the surface of the substrate thus filled with the active material and thereafter performing defoaming to form a layer of fluororesin on the surface of the substrate.

The dispersion medium of fluororesin preferably contains a surface active agent.

Air is fed into a dispersion medium containing fine powder of fluororesin, i.e., a fluororesin dispersion medium, to form bubbles containing fluororesin. A substrate filled with an active material is passed through the bubbles thus formed, so that the bubbles are adhered to the surface of the substrate. Then defoaming is performed to define a layer of fluororesin on the surface of the substrate. Consequently, fluororesin is selectively adhered to the surface of the electrode.

Since fluororesin is added in the form of bubbles, falling of the active material from the substrate surface is reduced as compared with the conventional method of directly impregnating the substrate with a dispersion medium of fluororesin in the form of a liquid, and the amount of addition of fluororesin can be easily adjusted.

The amount of addition of fluororesin can be adjusted by controlling density of the fluororesin dispersion medium, or air pressure or air volume for forming the bubbles.

According to the third aspect of the present invention, fluororesin is added in the state of bubbles so that loss of the active material can be effectively prevented in the manufacturing steps, to provide a very strong electrode for a battery which is excellent in cycle characteristic, with excellent industrial merit.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
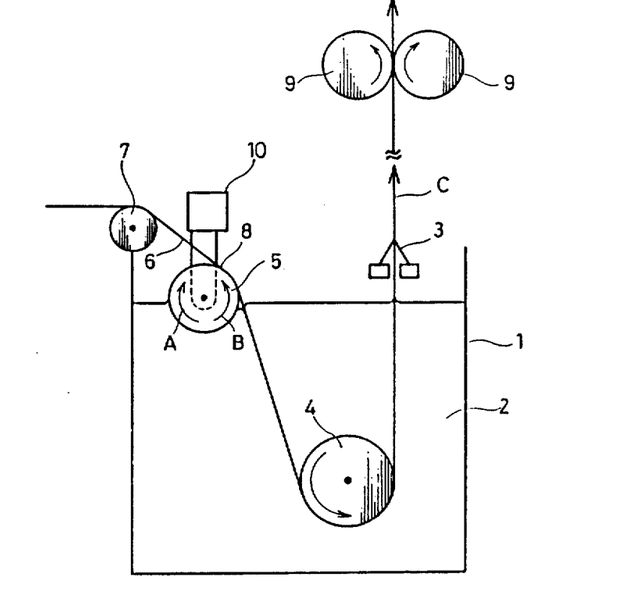
FIG. 1 is a block diagram showing a first embodiment of the present invention.

FIG. 1 is a block diagram showing a first embodiment of the present invention. Referring to FIG. 1, a vessel 1 contains a slurry 2, and a reversing roller 4 is provided in the slurry 2. A filling roller 5 is at least partially dipped but not completely submerged in the slurry 2. A substrate 6 formed, for example, of a nickel mat is brought into contact with the filling roller 5 at a contact point 8 and passed along the outer periphery of the reversing roller 4, to be lifted up by driving rollers 9. Between the reversing roller 4 and the driving rollers 9, scrapers 3 are provided above the slurry 2 to scrape off excessive slurry 2 adhered to the surfaces of the substrate 6. A guide roller 7 is provided on a wall surface of the vessel 1 in order to guide the substrate 6 toward the filling roller 5. The filling roller 5 is rotated by a driver 10 in a direction A or B.

The substrate 6 is pulled by the driving rollers 9 in a direction C, to be continuously supplied into the slurry 2. In the apparatus of this embodiment, the driving rollers 9 are substantially identical in diameter to the filling roller 5.

Thus, the filling roller 5 is rotated in a direction identical to that of movement of the substrate 6 along the arrow A in FIG. 1 at a rotational speed four times that of the driving rollers 9, with the result that the relative speed of outer peripheral surface of the filling roller (v.s. the substrate) is set to be three times the travel speed of the substrate.

In this specification, the relative speed of outer peripheral surface of the filling roller (v.s. the substrate) has the same meaning as the speed of outer peripheral surface of the filling roller relative to the substrate, that is, the speed of the same with respect to the substrate regarded as being at rest.

The continuously supplied substrate 6 is guided onto the filling roller 5 by guide roller 7. The filling roller 5 is at least partially dipped in the slurry 2, and driven by the driver 10 to be rotated in a direction identical or opposite to that of movement of the substrate 6 at a set speed. Upon such rotation of the filling roller 5, the slurry 2 is adhered to the surface of the filling roller 5 in the form of a film in a portion above the liquid level and carried to the contact point 8. Thus, the slurry 2 is filled into the substrate 6 at the contact point 8 with no change in content, due to rubbing action obtained by changing the travel speed of the substrate 6 and circumferential speed of the roller 5 and fluidity of the slurry 2 itself. Such filling is performed upon contact of the substrate 6 with the surface of the filling roller 5, until the substrate 6 is separated from the surface of the filling roller 5 to be submerged in the slurry 2. Thus, the slurry 2 is supplied from under the substrate 6 to be upwardly filled into the same. Therefore, air contained in the substrate 6 is readily and easily replaced by the slurry 2, which can be uniformly filled while leaving no pores in the substrate 6.

Figure 3:
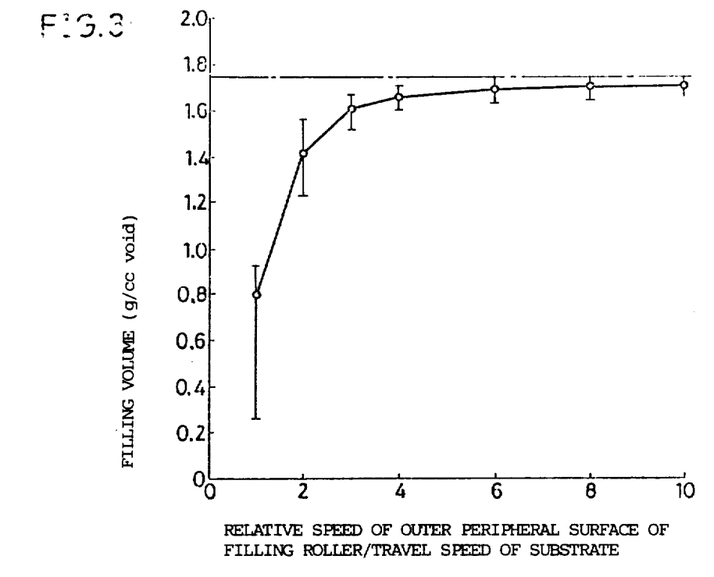
FIG. 3 illustrates relation between the ratio of the relative speed of outer peripheral surface of the filling roller (v.s. the substrate) to the travel speed of a substrate and filling volume of an active material in rotation of the filling roller in a direction identical to that of movement of the substrate.

It has been recognized that, in employment of the aforementioned filling method, the state of filling is varied with relation between the relative speed the outer peripheral surface of the filling roller (v.s. the substrate) and the travel speed of the substrate. The inventors have measured change in filling volume and dispersion thereof upon change in relative speed of the roller and the substrate. FIG. 3 illustrates the result, i.e., the relation between the ratio of the relative speed of outer peripheral surface of the filling roller (v.s. the substrate) to the travel speed of the substrate and the filling volume of the active material. Referring to FIG. 3, the direction of rotation of the roller is identical to that of movement of the substrate. It is understood that the active material can be substantially homogeneously filled in high density when the relative speed of outer peripheral surface of the filling roller (v.s. the substrate) is about three times the travel speed of the substrate. The one-dot chain line shown in FIG. 3 represents theoretical filling peaks obtained from the concentration of the slurry employed for this test. The substrate employed for this test was prepared from a nickel mat of 50 μm in average pore diameter, 20 μm in fiber diameter and 93% in porosity. The slurry was prepared by mixing nickel hydroxide powder of 20 um in average particle size with an aqueous solution of methyl cellulose (MC) to be 3000 cp. in viscosity upon measurement by a Brookfield type viscometer, to show Newtonian flow.

Referring to FIG. 3, every sample having small ratio of the relative speed of outer peripheral surface of the filling roller (v.s. the substrate) to the travel speed of the substrate was blocked in the vicinity of the substrate surface, to cause filtration.

Figure 4:
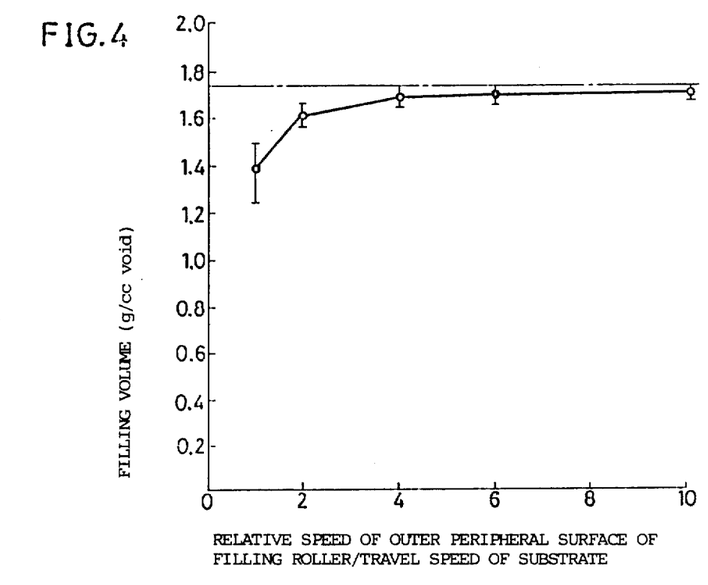
FIG. 4 illustrates relation between the ratio of the relative speed of outer peripheral surface of the filling roller (v.s. the substrate) to the travel speed of the substrate and filling volume f the active material in rotation of the filling roller in a direction opposite to that of movement of the substrate.

FIG. 4 shows relation between the ratio of the relative speed of outer peripheral surface of the filling roller (v.s. the substrate) to the travel speed of the substrate and the filling volume of the active material in rotation of the roller in a direction opposite to that of movement of the substrate, i.e., in the direction B shown in FIG. 1.

The filling roller 5 is rotated in a direction opposite to that of movement of the substrate 6 along the arrow B in FIG. 1 at a rotational speed twice that of the driving rollers 9. As a result, the relative speed of outer peripheral surface of the filling roller (v.s. the substrate) is three times the travel speed of the substrate. In this case, it is observed that the filling volume into the substrate is nearly constant when the relative speed is three times higher than the travel speed of the substrate. Since this phenomenon is also observed in case of rotating the filling roller in the direction identical to that of movement of the substrate, it is understood that such a phenomenon is not affected by the direction of rotation of the filling roller.

Table 1 shows the result of an experiment as to influence exerted on filling property by change in viscosity of the slurry. As obvious from Table 1, no problem was caused in a slurry showing Newtonian flow, within a range of 1000 to 10000 cp. in viscosity. Further, an excellent filling state was easily obtained in a slurry of low viscosity even if the ratio of the relative speed of outer peripheral surface of the filling roller (v.s. the substrate) to the travel speed of the substrate was reduced. However, it is to be understood that the speed ratio is preferably at least three. With viscosity being smaller than 1000 cp., sedimentation of powder quickly occurred to disable holding of a homogeneous slurry, while the moisture content was increased to reduce density of the active material in the slurry, leading to reduction in filling volume. With viscosity exceeding 10000 cp., on the other hand, fluidity of the slurry was so reduced that the same did not flow into the substrate. Every slurry employed for the experiment of Table 1 showed Newtonian flow. Further, the filling roller was rotated in a direction identical to that of movement of the substrate, and the ratio of the relative speed of outer peripheral surface of the filling roller (v.s. the substrate) to the travel speed of the substrate was six in each sample. The unit of the filling volume (g/cc-void) shows the weight of the active material filled per unit volume of an actual space in the substrate.

TABLE 1

| Viscosity of Slurry (cp) | Filling Volume (g/cc-void) |
|---|---|
| 500 | 1.40 |
| 1000 | 1.63 |
| 3000 | 1.70 |
| 6000 | 1.72 |
| 10000 | 1.69 |
| 20000 | 1.51 |

Description is now made on Examples corresponding to the first aspect of the present invention and reference examples.

EXAMPLE 1-1

Nickel hydroxide powder, being an active material, was mixed with an MC aqueous solution to prepare a slurry of 3000 cp. in viscosity showing Newtonian flow. This slurry was filled into a nickel mat of 20 μm in fiber diameter, 50 μm in average pore diameter and 93% in porosity by employing an apparatus such as that shown in FIG. 1. The filling roller 5 is rotated in a direction identical to that of movement of the substrate 6 along the arrow A in FIG. 1 at a rotational speed five times that of the driving rollers 9. As a result, the relative speed of outer peripheral surface of the filling roller (v.s. the substrate) is four times the travel speed of the substrate.

EXAMPLE 1-2

The filling roller 5 is rotated in a direction opposite to that of movement of the substrate 6 along the arrow B in FIG. 1 at a rotational speed five times that of the driving rollers 9. As a result, the relative speed of outer peripheral surface of the filling roller (v.s. the substrate) is six times the travel speed of the substrate. The other conditions are similar to Example 1-1.

EXAMPLE 1-3

Figure 2:
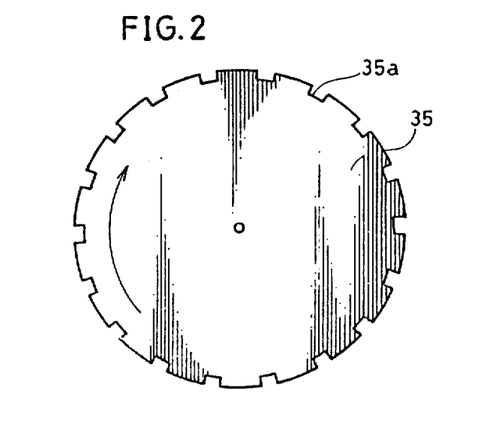
FIG. 2 is a side elevational view showing another example of a filling roller employed in the first embodiment of the present invention.

A slurry, a substrate and an apparatus identical to those of Example 1-1 were employed to fill the slurry through a filling roller 35 shown in FIG. 2 under conditions identical to those of Example 1-1. As shown in FIG. 2, the filling roller 35 is provided on its outer peripheral surface with a large number of grooves 35a which are perpendicular to the direction of rotation.

REFERENCE EXAMPLE 1-1

The volume of a binder contained in an MC aqueous solution was reduced to prepare a slurry identical in moisture content to that in Example 1-1 but showing no Newtonian flow. This slurry was filled into a substrate under the same conditions as Example 1-1.

REFERENCE EXAMPLE 1-2

The filling roller 5 is rotated in a direction identical to that of movement of the substrate 6 along the arrow A in FIG. 1 at a rotational speed three times that of the driving rollers 9. As a result, the relative speed of outer peripheral surface of the filling roller (v.s. the substrate) is twice the traveling speed of the substrate. The other conditions are similar to Example 1-1.

REFERENCE EXAMPLE 1-3

A rubbing member reciprocating on the upper surface of a substrate was employed to continuously supply a slurry identical to that in Example 1-1 onto the same substance thereby to fill the same.

The substrates of the above Examples and reference examples thus filled with the slurries were dried and the weights thereof were measured to obtain actual filling volume values. Table 2 shows the results.

TABLE 2

|  | Filling Volume (g/cc-void) | Fluctuation in Filling Volume (%) | Time required for Filling |
|---|---|---|---|
| Example 1-1 | 1.70 | 4 | 100 |
| Example 1-2 | 1.70 | 4 | 100 |
| Example 1-3 | 1.73 | 3 | 100 |
| Reference Example 1-1 | 0.63 | 5 | 100 |
| Reference Example 1-2 | 1.42 | 12 | 100 |
| Reference Example 1-3 | 1.57 | 7 | 270 |

It is understood from Table 2 that all of electrodes provided by Examples 1-1 to 1-3 according to the first aspect of the present invention were excellent in level of filling volume, homogeneity and productivity. It has been recognized that filling efficiency is further improved by providing grooves on the surface of the filling roller as shown in Example 1-3. This may be considered because the angle at the contact point between the substrate and the filling roller is increased to cause increase in press-in force.

In addition to the above, a distance of movement of the substrate with the roller surface upon contact with the filling roller, i.e., the contact area between the substrate and the roller may be interpreted as being an element for changing the filling volume of the slurry. However, substantially no difference was caused upon change in such distance, since the slurry was mostly filled at the contact point in practice.

Although the above description has been made with reference to an electrode containing nickel hydroxide as a main active material, the present invention is not restricted to this as lead oxide, for example, may be employed as the active material. Further, although the above description has been made with reference to a nickel mat implementing a metal porous body having three-dimensionally continuous pores, foam nickel or the like may also be employed.

Description is now made on Example of a second aspect of the present invention.

An active material slurry was prepared by mixing a main component of nickel hydroxide with 0.1 percent by weight of sodium hexametaphosphate, 0.1 percent by weight of hydroxypropyl cellulose (HPC) and 30 percent by weight of water, to be 3000 cp. in viscosity. A substrate was prepared by a metal porous body of foam nickel of 250 μm in average pore diameter and 1.0 mm in thickness. The substrate, being in the form of a hoop, was introduced into a filling vessel provided therein with a filling roller and containing the active material slurry, to be filled with the slurry. Table 3 shows the result of comparison of filling rates upon thickness adjustment of substrates before and after filling of slurries.

TABLE 3

| No. | Initial Substrate Thickness | Adjustment of Substrate Thickness before Filling | Adjustment of Substrate Thickness after Filling | Filling Rate (g/cc-void) |
|---|---|---|---|---|
| 1 | 1.00 ± 0.03 | none | none | 1.45 δ = 0.12 |
| 2 | 1.00 ± 0.03 | 0.95 ± 0.005 | none | 1.45 δ = 0.07 |
| 3 | 1.00 ± 0.03 | none | 0.95 ± 0.005 | 1.49 δ = 0.03 |

It is understood from Table 3 that samples adjusted after filling had a small standard deviation δ and high filling rates. It has been recognized through this experiment that it is necessary to prevent a solid part of the slurry squeezed up from the substrate upon filling by a roller for thickness adjustment, i.e., a compression roller, from being adhered to the roller surface. It has also been recognized that dispersion in filling volume was varied with the position of the roller. A further experiment was made as to such recognition, to find the following facts: First, the roller is preferably located to be at least partially in contact with the liquid surface of the slurry, and more preferably, the roller is submerged in the slurry to a part for pressurizing the substrate. This is obvious from the result of the following Table 4. Further, the amount of compression of the substrate is preferably not in excess of 0.1 mm. This is obvious from the following Table 5.

In the experiment of Tables 4 and 5, slurry composition and substrate structure are identical to those already described. Referring to Table 4, symbol ⊚ indicates such a state that absolutely no substance was adhered on the roller surface. Symbol ○ indicates such a state that the roller was capable of continuous operation in spite of slight adhesion. Symbol △ indicates such a state that the roller was capable of operation for only a short time. Referring to Table 5, each roller was half submerged in the slurry.

TABLE 4

| Roller Position | (Initial) Filling Volume (g/cc-void) | State of Roller |
|---|---|---|
| Completely Submerged in Slurry | 1.50 δ = 0.08 | ⊚ |
| Half Submerged in Slurry | 1.49 δ = 0.03 | ⊚ |
| One Third Submerged in Slurry | 1.49 δ = 0.03 | ○ |
| Separated from Slurry | 1.49 δ = 0.05 | △ |

TABLE 5

| Amount of Compression of Substrate (mm) | Filling Volume (g/cc-void) | Remarks |
|---|---|---|
| 0.03 | 1.49 δ = 0.03 | — |
| 0.05 | 1.49 δ = 0.03 | — |
| 0.07 | 1.49 δ = 0.03 | — |
| 0.10 | 1.51 δ = 0.04 | Thickness Accuracy of Substrate Slightly Reduced (and so forth) |
| 0.15 | 1.53 δ = 0.05 | Solid Sticked on Roller Surface |
| 0.20 | 1.55 δ = 0.06 | Solid Sticked on Roller Surface |

The compression roller is preferably located in the slurry because the wet state of the roller surface is rendered constant and the proportion of a solid part of the slurry squeezed up from the substrate, i.e., the moisture content of the said part is made identical to that of the slurry contained in the vessel, to cause no solid-liquid separation. Further, the filling volume is slightly increased when the compression roller is completely submerged in the slurry because the substrate springs back upon thickness adjustment by the compression roller so that the slurry is re-filled if the same is provided in large volume around the substrate. Thus, the roller is preferably located to be at least partially in contact with the slurry contained in the vessel, and more preferably, the roller is half submerged in the slurry to a part for pressurizing the substrate, if possible.

The range of thickness adjustment must not exceed 0.1 mm, since accuracy in thickness of the substrate is reduced and sticking of powder on the roller surface is started if the same is in excess of 0.10 mm. As shown in Table 5, the filling volume is improved with an amount of compression of at least 0.10 mm since moisture is preferentially squeezed up from the filled slurry to reduce the moisture content.

Even if the slurry is filled under the aforementioned conditions, thin films of the slurry, which cannot be uniformalized in thickness, are inevitably formed on the surfaces of the substrate. Therefore, scrapers are employed of remove the films in advance to a final stage of drying the substrate, thereby to further reduce dispersion in filling volume.

Figure 5:
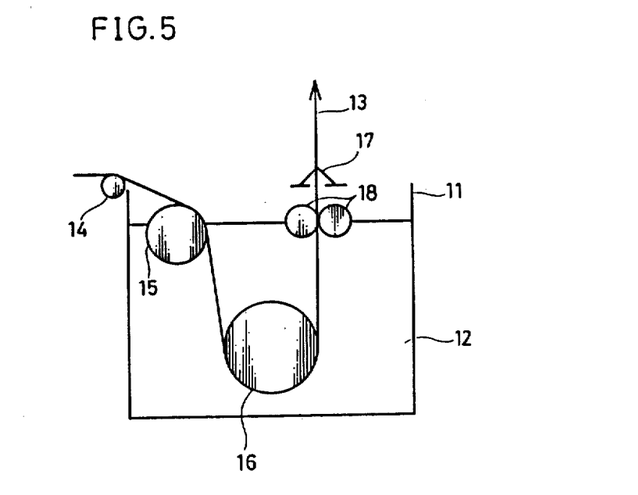
FIG. 5 is a block diagram showing a second embodiment of the present invention.

FIG. 5 is a block diagram for illustrating the second aspect of the present invention. Referring to FIG. 5, a vessel 11 contains a slurry 12, and a second guide roller 16 is provided in the slurry 12. A filling roller 15 is provided to be partially dipped in the slurry 12. A first guide roller 14 is provided in front of the filling roller 15. A substrate 13 is passed along surfaces of the first guide roller 14, the filling roller 15 and the second guide roller 16 provided in the slurry 12, to be further passed through compression rollers 18, which are provided to be half submerged in the slurry 12. Scrapers 17 are adapted to scrape off thin films of the slurry defined on the surfaces of the substrate 13. The filling roller 15 may be so provided as to work similarly to the filling roller 5 shown in FIG. 1.

EXAMPLE 2-1

A slurry of 4000 cp. in viscosity was prepared by 100 parts of powder mainly composed of nickel hydroxide, 0.1 part of hydroxypropyl cellulose (HPC), 0.1 part of sodium hexametaphosphate and 30 parts of water, to be filled into a substrate of foam nickel of 1.0 mm in thickness, through the apparatus shown in FIG. 5. The amount of compression after filling was 0.03 mm. The filling roller was rotated in the same direction as movement of the substrate at a speed five times the travel speed of the substrate. As a result, the relative speed of outer peripheral surface of the filling roller (v.s. the substrate) is four times the travel speed of the substrate.

EXAMPLE 2-2

A slurry of 2000 cp. in viscosity, being prepared by 100 parts of powder mainly composed of nickel hydroxide, 0.4 parts of hydroxypropyl cellulose (HPC) and 55 parts of water, was filled into a substrate of foam nickel of 1.35 mm in thickness under the same conditions as Example 2-1.

REFERENCE EXAMPLE 2-1

A substrate identical to that in Example 2-1 was previously compressed to 0.97 mm, to be filled with a slurry. No compression was made after filling of the slurry. Other conditions were identical to those of Example 2-1.

REFERENCE EXAMPLE 2-2

A substrate identical to that of Example 2-1 was employed. No compression was made after filling of the slurry. Other conditions were identical to those of Example 2-1.

Electrode plates obtained by the aforementioned Examples and reference examples were exposed to scrapers after filling of active material slurries under the absolutely same conditions, to be dried and then rolled by a calender roller.

Table 6 shows filling rates of the electrode plates according to the aforementioned Examples and reference examples, extension percentage levels of the electrode plates upon rolling by the calender roller, and the like.

TABLE 6

| | Filling Volume (g/cc-void) | Extension after Rolling (%) | Thickness after Rolling (mm) |
|---|---|---|---|
| Example 2-1 | 1.49 δ = 0.03 | 3.3 to 3.5 | 0.55 δ = 0.01 |
| Example 2-2 | 1.10 δ = 0.02 | 3.6 to 3.9 | 0.55 δ = 0.01 |
| Reference Example 2-1 | 1.45 δ = 0.07 | 3.8 to 4.5 | 0.54 δ = 0.02 |
| Reference Example 2-2 | 1.45 δ = 0.12 | 3.7 to 5.9 | 0.54 δ = 0.03 |

As shown in Table 6, electrode plates of Examples 2-1 and 2-2 along the second aspect of the present invention had smaller values of dispersion in filling volume, to restrict dispersion in quality in subsequent steps.

As obvious from Example 2-2, an effect of the present invention can be obtained by a slurry having fluidity to substantially cause no solid-liquid separation. Thus, the present invention is applicable in a wide range.

Although the description of the second aspect has been made with reference to only a nickel anode containing nickel hydroxide as an active material, the present invention is not restricted to this but also applicable to another type of electrode so far as a three-dimensional metal porous body is directly filled with a slurried pulverulent active material. The three-dimensional metal porous body may be prepared by a nickel mat etc., in addition to foam nickel shown with reference to Examples.

Description is now made on Examples according to a third aspect of the present invention.

EXAMPLE 3-1

Figure 6:
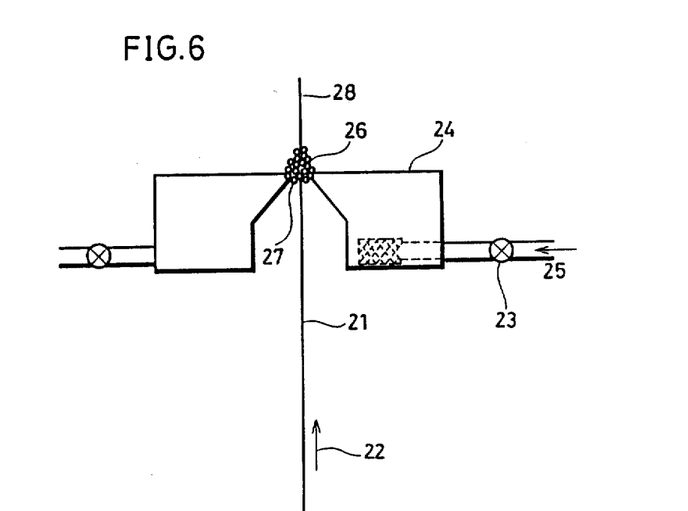
FIG. 6 is a block diagram showing a third embodiment of the present invention.

Nickel hydroxide powder of 6 to 7 μm in average particle size, serving as an active material, was mixed into an aqueous solution of methyl cellulose (MC), to obtain an active material slurry. A substrate of foam nickel of 96% in porosity was filled with the said slurry, and then dried. The dried substrate was passed through a foaming part of a fluororesin dispersion medium. Thereafter, defoaming was performed to form layers of fluororesin on the surfaces of the substrate. FIG. 6 is a block diagram for illustrating such a state. Referring to FIG. 6, a substrate 21 is moved in a direction 22 by a driver (not shown). An air valve 23 is connected to a container 24 containing a dispersion medium of fluororesin, to feed air 25 into the container 24. An opening 26 is defined in a portion of the container 24 and in contact with the surfaces of the substrate 21 to form bubbles 27 of fluororesin, adhere the bubbles 27 to the substrate 21 and then cause defoaming by drying, thereby to continuously form layers of fluororesin on the surfaces of the substrate 21. In concrete terms, air of 2/min. was fed into the fluororesin dispersion medium 2 of 4% (Teflon 30-J; product by DU PONT-MITSUI FLUOROCHEMICALS COMPANY, LTD.) to form the bubbles 27, while the substrate 21 was moved at a speed of 30 cm/min. The amount of addition of fluororesin was 1 percent by weight with respect to the active material. Upon formation of the films of fluororesin, the substrate 28 was dried at 120° C. for five minutes, and pressed to prescribed thickness. An electrode plate thus obtained was cut in prescribed size, thereby to obtain an electrode A along the third aspect of the present invention.

REFERENCE EXAMPLE 3-1

A substrate was filled with an active material slurry similar to that in Example 3-1, dried and then pressed to prescribed thickness. Then the substrate was dipped in a fluororesin dispersion medium of 4% for 30 seconds, to be impregnated with fluororesin. The amount of impregnation of fluororesin was 1 percent by weight with respect to the active material, similarly to Example 3-1. The substrate was dried upon impregnation, to obtain a reference electrode B.

REFERENCE EXAMPLE 3-2

A substrate was filled with an active material slurry similar to that in Example 3-1, dried and then pressed to prescribed thickness with no addition of fluororesin. Thus, a reference electrode C was obtained.

Study was made as to the degrees of falling of the active materials caused by addition of fluororesin in Example 3-1 and reference example 3-1. As the result, falling of the active material of about 3% was observed in the reference electrode B. On the other hand, substantially no falling of the active material was recognized in the electrode A according to the present invention. Thus, it is understood that falling of the active material is efficiently suppressed by the method of adding fluororesin in the form of bubbles according to the third aspect of the present invention.

Figure 7:
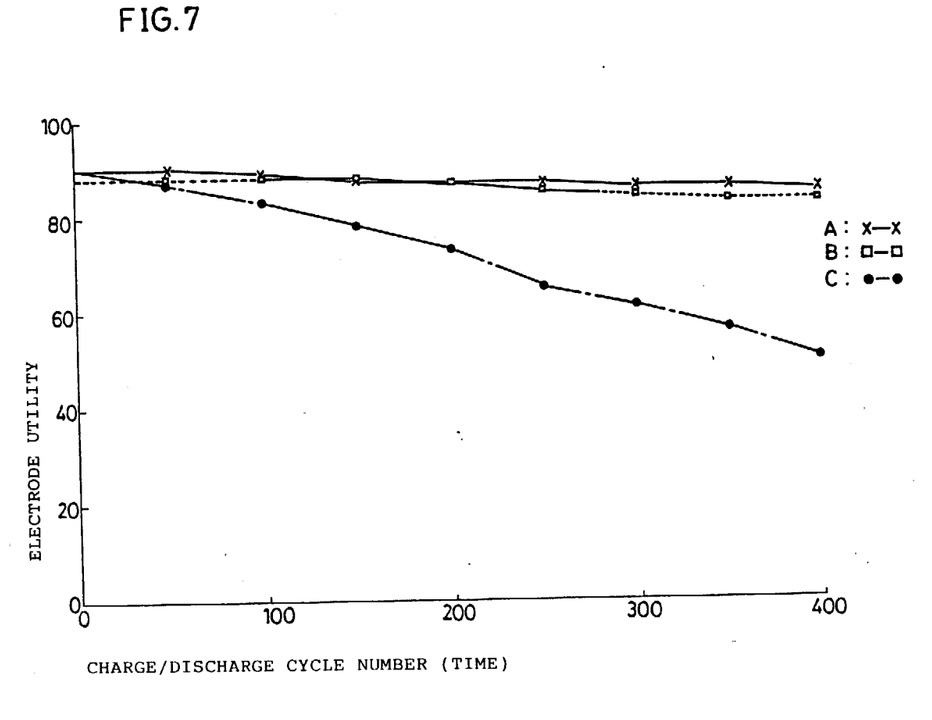
FIG. 7 illustrates transition in electrode utilization factor following progress in cycle number in the third embodiment of the present invention.

Then, the electrodes A, B and C were respectively combined with well-known cadmium electrodes, to prepare batteries. These batteries were charged and discharged in cycle, thereby to examine transition in utilization factor of the electrodes. FIG. 7 illustrates the results of transition in utility of the electrodes A, B and C with progress in cycle number. In this experiment, the electrodes were charged by current of 0.1 C for 16 hours and then discharged by current of 1 C until battery voltage levels reached 0.8 V. It is understood that falling of the active material was caused with progress in charge/discharge cycle number, to reduce the utilization factor of the electrode in the reference electrode C. This is because no fluororesin was provided to hold the active material. On the other hand, reduction in utilization factor was small in reference electrode B, being impregnated with fluororesin to hold the active material. In reference electrode B, however, the degree of falling of the active material upon addition of fluororesin was large as compared with the electrode A according to the present invention.

Thus, it is understood that the degree of falling of the active material is small and electrode strength is excellent in the electrode A according to the present invention, which is excellent in cycle characteristic with less deterioration in utilization factor.

Although the substrate is pressed to a prescribed size after formation of the layers of fluororesin in the aforementioned Example according to the third aspect of the present invention, the layers of fluororesin may be formed after the substrate is pressed to prescribed size.

Although the substrate is prepared by foam nickel in the above Example, a metal porous body may be prepared by a sintered body of nickel fiber. Foaming is facilitated if a surface active agent is contained in the dispersion medium of fluororesin, to enable fine adjustment of the amount of addition of fluororesin.

Although the active material is filled in the form of a slurry in the above Example, the same may be in the form of paste, to cause no problem.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of manufacturing an electrode for a battery comprising:
   preparing a substrate composed of a metal porous body having three-dimensionally continuous pores, a slurry mainly composed of active material powder to fill said pores of said substrate, a vessel for containing said slurry and a filing roller being at least partially dipped but not completely submerged in said slurry contained in said vessel;
   continuously supplying said substrate onto said filling roller at a contact point above the surface level of the slurry; and
   rotating said filling roller in such a manner that the speed of outer peripheral surface of said filling roller facing said substrate is faster than the travel speed of said substrate to fill said pores of said substrate with said slurry.

2. A method in accordance with claim 1, wherein said preparing step comprises a step of preparing a slurry of a viscous fluid showing Newtonian flow.

3. A method in accordance with claim 2, wherein said preparation step comprises a step of preparing a slurry of 1000 to 10000 cp. in viscosity.

4. A method in accordance with claim 1, wherein said filling step comprises a step of rotating said roller in such a manner that said speed of outer peripheral surface of said filling roller relative to said substrate is at least three times faster than the travel speed of said substrate.

5. An apparatus for manufacturing an electrode for a battery by filling a slurry mainly composed of active material powder into pores of a continuously supplied substrate formed by a metal porous body having three-dimensionally continuous pores, said apparatus comprising:
   means for continuously supplying said substrate;
   a vessel containing said slurry;
   a filling roller located to be at least partially dipped but not completely submerged in said slurry contained in said vessel to be in contact with said substrate in at least a point not being submerged in said slurry contained in said vessel for filling said slurry into said substrate; and
   driving means for rotating said filling roller in such a manner that the speed of outer peripheral surface of said filling roller facing said substrate is higher than the travel speed of said substrate.

6. A manufacturing apparatus in accordance with claim 5, wherein said speed of outer peripheral surface of said filling roller relative to said substrate is at least three times higher than the travel speed of said substrate.

7. A manufacturing apparatus in accordance with claim 5, wherein said filling roller is provided on its outer peripheral surface with grooves extending perpendicularly to the direction of rotation.

8. A method of manufacturing an electrode for a battery comprising:
   a step of filling a substrate formed by a metal porous body having three-dimensionally continuous pores with a slurry mainly composed of active material powder;
   a step of compressing said substrate filled with said slurry to prescribed thickness by a compression roller partially submerged in said slurry; and
   a step of scraping off a part of said slurry adhered on the surface of said compressed substrate by a scraper.

9. A method in accordance with claim 8, wherein said filling step comprises a step of filling a slurry having fluidity to cause no solid-liquid separation.

10. A method in accordance with claim 8, wherein said compression step comprises a step of compressing said substrate filled with said slurry by a compression roller provided to be submerged in said slurry to a part for pressurizing said substrate.

11. A method in accordance with claim 8, wherein said compression step comprises a step of compressing said substrate so that the amount of compression is not more than 0.1 mm.

12. A method of manufacturing an electrode for a battery comprising:
   a step of filling a substrate formed by a metal porous body having three-dimensionally continuous pores with an active material; and
   a step of adhering bubbles of a fluororesin dispersion medium to the surface of said substrate filled with said active material to thereafter cause defoaming, to form a layer of fluororesin on the surface of said substrate.

13. A method in accordance with claim 12, wherein said step of forming said layer of fluororesin comprises a step of adhering bubbles of a fluororesin dispersion medium containing a surface active agent to the surface of said substrate.

* * * * *